(12) United States Patent
Durand (10) Patent No.: US 11,603,802 B2
(45) Date of Patent: Mar. 14, 2023

(54) METHODS AND SYSTEMS FOR STARTING A GAS TURBINE ENGINE

(71) Applicant: PRATT & WHITNEY CANADA CORP., Longueuil (CA)

(72) Inventor: Sean Durand, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 258 days.

(21) Appl. No.: 16/552,200

(22) Filed: Aug. 27, 2019

(65) Prior Publication Data

US 2021/0062729 A1  Mar. 4, 2021

(51) Int. Cl.
| | | |
|---|---|---|
| F02C 7/262 | (2006.01) | |
| F02C 9/26  | (2006.01) | |
| F02C 7/236 | (2006.01) | |
| F02C 3/06  | (2006.01) | |
| F02C 9/28  | (2006.01) | |

(52) U.S. Cl.
CPC ............... *F02C 9/26* (2013.01); *F02C 3/06* (2013.01); *F02C 7/236* (2013.01); *F02C 7/262* (2013.01); *F02C 9/28* (2013.01)

(58) Field of Classification Search
CPC .... F02C 9/26; F02C 9/28; F02C 7/262; F02C 7/236; F02C 7/26; F02C 7/32; F02C 7/22; F02C 7/222
See application file for complete search history.

(56) References Cited

U.S. PATENT DOCUMENTS

| | | | | |
|---|---|---|---|---|
| 5,116,362 | A * | 5/1992 | Arline | F02C 7/236 |
| | | | | 417/203 |
| 5,490,387 | A * | 2/1996 | Bisson | F02C 7/236 |
| | | | | 60/734 |
| 7,401,461 | B2 * | 7/2008 | Eick | F02C 7/236 |
| | | | | 60/39.091 |
| 8,650,883 | B2 * | 2/2014 | Rabiei | F02C 9/28 |
| | | | | 250/339.04 |
| 8,666,632 | B2 | 3/2014 | Zebrowski et al. | |
| 9,091,212 | B2 * | 7/2015 | Veilleux, Jr. | F02C 9/263 |
| 9,316,157 | B2 * | 4/2016 | Ripley | F02C 7/32 |
| 9,500,135 | B2 * | 11/2016 | Bader | F02C 7/236 |
| 9,771,906 | B2 * | 9/2017 | Henson | F02C 7/262 |
| 10,208,672 | B2 | 2/2019 | Ripley | |
| 10,563,594 | B2 * | 2/2020 | Harper | F02C 9/28 |
| 2008/0289338 | A1 * | 11/2008 | Desai | F02C 7/232 |
| | | | | 60/734 |
| 2009/0199823 | A1 * | 8/2009 | Mahoney | F02C 9/30 |
| | | | | 123/497 |
| 2009/0282837 | A1 * | 11/2009 | Yamanaka | F02C 7/185 |
| | | | | 60/785 |

(Continued)

*Primary Examiner* — Todd E Manahan
*Assistant Examiner* — Thuyhang N Nguyen
(74) *Attorney, Agent, or Firm* — Norton Rose Fulbright Canada LLP (57) ABSTRACT

Methods and systems of starting a gas turbine engine are provided. During startup, a fuel pressure associated with a primary fuel supply of the gas turbine engine is monitored. A low-pressure event for the primary fuel supply is detected when the fuel pressure falls below a predetermined threshold. Responsive to detecting the low pressure event, an electric backup boost pump is activated by an engine controller to provide fuel to the gas turbine engine.

15 Claims, 4 Drawing Sheets

(56) References Cited

U.S. PATENT DOCUMENTS

| | | | |
|---|---|---|---|
| 2010/0293919 A1* | 11/2010 | Poisson | F02C 7/236 60/39.281 |
| 2011/0296846 A1* | 12/2011 | Aurousseau | F02C 7/275 60/787 |
| 2014/0060658 A1* | 3/2014 | Hains | F02C 7/22 137/2 |
| 2016/0010493 A1* | 1/2016 | O'Dea | F01D 21/003 60/776 |
| 2016/0069276 A1* | 3/2016 | Djelassi | F02C 9/26 60/776 |
| 2016/0195025 A1* | 7/2016 | Ajami | G01K 13/02 60/776 |
| 2017/0052087 A1* | 2/2017 | Faqihi | G01M 3/243 |
| 2018/0065756 A1 | 3/2018 | Cirioii et al. | |
| 2021/0095601 A1* | 4/2021 | Yeung | E21B 43/26 |

\* cited by examiner

METHODS AND SYSTEMS FOR STARTING A GAS TURBINE ENGINE

TECHNICAL FIELD

The present disclosure relates generally to gas turbine engines, and specifically to starting gas turbine engines.

BACKGROUND OF THE ART

In a gas turbine engine, continuous inlet air is compressed, mixed with fuel in an inflammable proportion, and exposed to an ignition source to ignite the mixture which then continues to burn to produce combustion products. The engine ignition process involves certain challenges, which can result in ignition failure for gas turbine engine.

As such, there is room for improvement.

SUMMARY

In accordance with at least one broad aspect, there is provided a method of starting a gas turbine engine. During startup, a fuel pressure associated with a primary fuel supply of the gas turbine engine is monitored. A low-pressure event for the primary fuel supply is detected when the fuel pressure falls below a predetermined threshold. Responsive to detecting the low pressure event, an electric backup boost pump is activated by an engine controller to provide fuel to the gas turbine engine.

In according with at least one other broad aspect, there is provided a system for starting a gas turbine engine. The system comprises a processing unit and a non-transitory computer-readable memory communicatively coupled to the processing unit. The computer-readable memory comprises comprising computer-readable program instructions executable by the processing unit for: monitoring, during startup, a fuel pressure associated with a primary fuel supply of the gas turbine engine; detecting a low-pressure event for the primary fuel supply when the fuel pressure falls below a predetermined threshold; and responsive to detecting the low pressure event, activating, by an engine controller, an electric backup boost pump to provide fuel to the gas turbine engine.

In accordance with at least one further broad aspect, there is provided a system for starting a gas turbine engine. The system comprises a pressure sensor producing fuel pressure readings associated with a primary fuel supply of the gas turbine engine. The system further comprises an engine controller coupled to the pressure sensor for: monitoring, during startup, the fuel pressure readings; detecting a low-pressure event for the primary fuel supply when at least one of the fuel pressure readings falls below a predetermined threshold; and responsive to detecting the low pressure event, activating an electric backup boost pump to provide fuel to the gas turbine engine.

Features of the systems, devices, and methods described herein may be used in various combinations, in accordance with the embodiments described herein.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
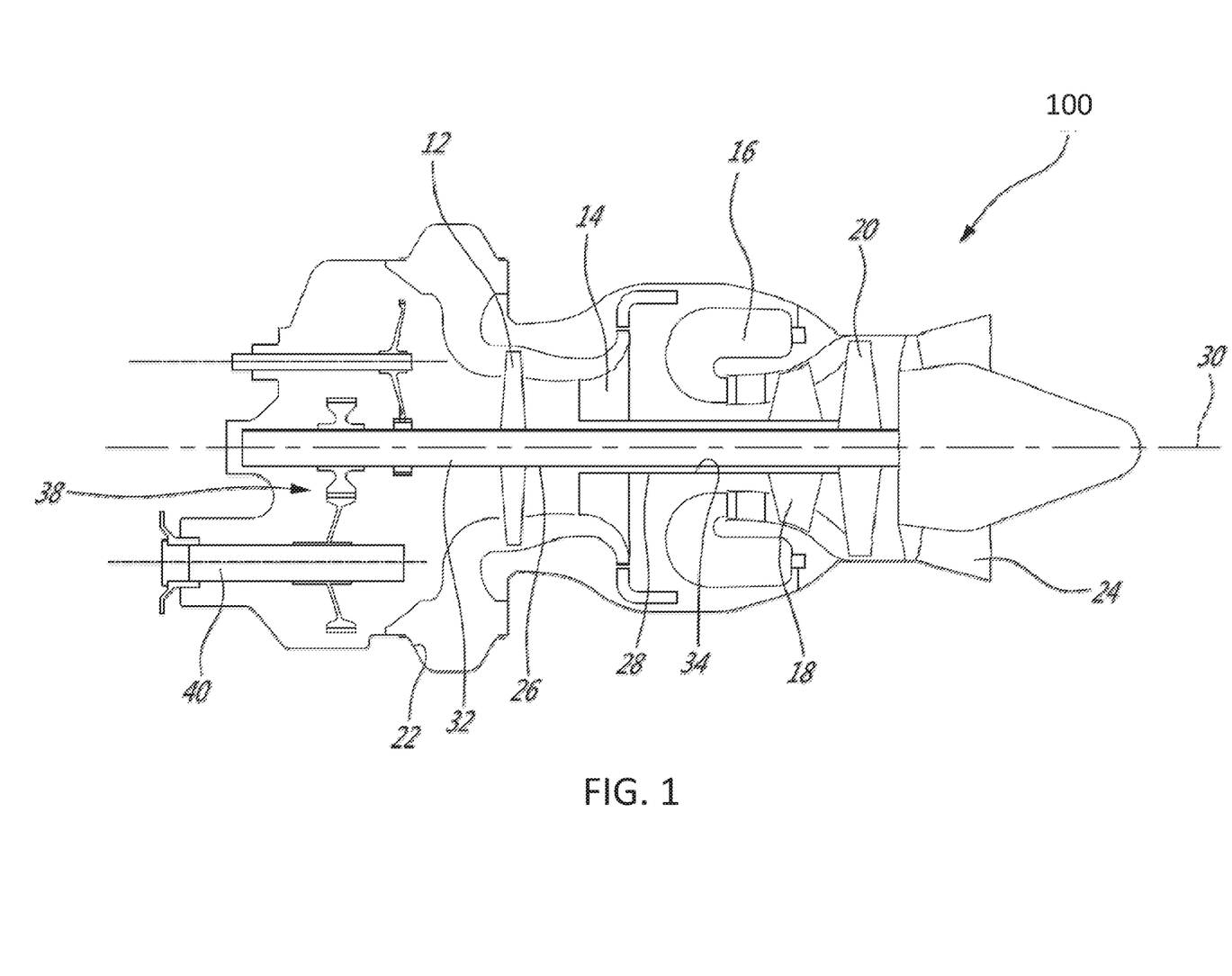
FIG. 1 is a cross-sectional view of an example turboshaft engine of an aircraft.

With reference to FIG. 1, a gas turbine engine 100 is shown. In this example, the engine 100 is a turboshaft engine. It should be noted, however, that the techniques described herein are considered to be applicable to other types of gas turbine engines, including turbofan, turboprop, and turbojet engines, and to other types of combustion engines, including Wankel engines and reciprocating engines.

The engine 100 generally comprises in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 100 has multiple, i.e. two or more, spools which may perform the compression to pressurize the air received through an air inlet 22, and which extract energy from the combustion gases before they exit via an exhaust outlet 24. In the illustrated embodiment, the engine 100 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 100 may include a transmission 38 driven by the low pressure shaft 32 and driving a rotatable output shaft 40. The transmission 38 may vary a ratio between rotational speeds of the low pressure shaft 32 and the output shaft 40.

Figure 2:
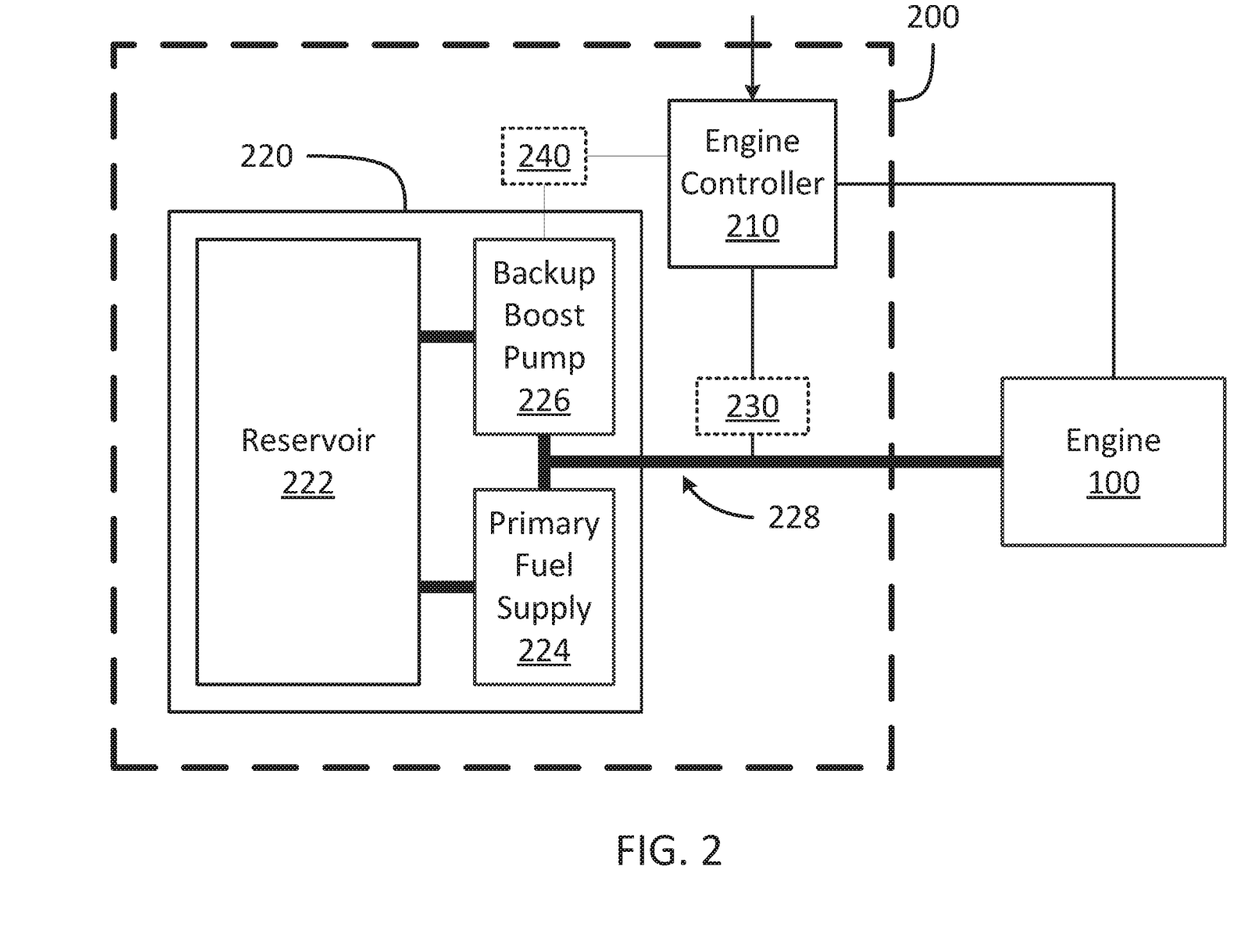
FIG. 2 is a block diagram of an example system for starting an engine.

With reference to FIG. 2, there is shown a system 200 for starting a gas turbine engine, for instance the engine 100. The system 200 is composed of an engine controller 210, a fuel system 220, optionally a pressure sensor 230, and optionally an electrical relay 240. The engine controller 210 can control various aspects of the operation of the engine 100, including, but not limited to, modulating a rate of fuel flow provided to the engine 100, adjusting the position and/or orientation of variable geometry mechanisms within the engine 100, adjusting a bleed air level of the engine 100, and the like. In some embodiments, the engine controller 210 is configured for controlling operation of multiple engines.

For example, the engine controller 210 can be provided as one or more Full Authority Digital Engine Controllers (FADECs) or similar devices. The engine controller 210 is configured for receiving various instructions from an operator of the engine 100 and/or of an aircraft or other vehicle of which the engine 100 is a component. In addition, the engine controller 210 can provide to the operator various information about the operation of the engine 100. In some embodiments, the engine controller 210 controls the operation of the engine 100 via one or more electrical and electronic communication pathways. Alternatively, or in addition, the engine controller 210 controls the operation of the engine 100 via one or more actuators, mechanical linkages, hydraulic systems, and the like.

The fuel system 220 is composed of a reservoir 222 which serves to contain fuel to supply the engine 100 via a fuel conduit 228. Fuel in the reservoir 222 can be conveyed to the engine 100 via the fuel conduit 228, for example by operation of a primary fuel supply 224 and/or a backup boost pump 226. The primary fuel supply 224 can include any suitable type of fuel pump or other mechanism for conveying fuel from the reservoir 222 to the engine 100. The backup boost pump 226 can be any suitable type of fuel pump or other mechanism which is also for conveying fuel from the reservoir 222 to the engine 100, and which operates independently from the primary fuel supply 224. For example, the primary fuel supply 224 can be a suction- or pressure-based pump, and the backup boost pump 226 can be an electrical pump. In this fashion, the backup boost pump 226 can, in some embodiments, provide a separate failure mode for supplying fuel to the engine 100. The fuel conduit 228 can be any suitable type of pipe, channel, or the like, which facilitates the flow of fuel to the engine 100.

The primary fuel supply 224 can be controlled by way of an avionics system associated with an aircraft of which the engine 100 is a component, or by way of any other suitable control system independent from the engine controller 210. The backup boost pump 226 can also be controlled by the avionics system or other control system independent from the engine controller 210. In some embodiments, the fuel system 220 includes a plurality of backup boost pumps 226, or includes additional backup fuel delivery systems which serve to convey fuel from the reservoir 222 to the engine 100, whether via the fuel conduit 228 or via another fuel conduit.

The optional pressure sensor 230 serves to measure a fuel pressure associated with the engine 100, that is to say, a fuel pressure for fuel supplied to the engine 100 from the fuel system 220. The pressure sensor 230 can be a pressure transducer, a pressure switch, or any other suitable device for measuring pressure of a fluid. The pressure sensor 230 can report the fuel pressure to the engine controller 210. Although shown here as being coupled to the fuel conduit 228, it should be understood that the pressure sensor 230 can be coupled to a fuel inlet of the engine 100, to a fuel outlet of the primary fuel supply 224, to a fuel outlet of the fuel system 220 generally, to any other suitable component of the fuel system 220, or to any other suitable component which allows the pressure sensor 230 to measure the fuel pressure associated with the engine 100. In some embodiments, the functionality of the pressure sensor 230 is embedded in, or otherwise combined with, the engine controller 210, and the pressure sensor 230 can be omitted. For example, the engine controller 210 can make use of a virtual sensor, that is to say, a software-based sensor which produces a reading based on data from other sensors, to derive the fuel pressure.

The fuel system 220 provides the engine 100 with fuel to cause ignition of the engine 100, to maintain the engine 100 in an operating state, and the like. In many operating states, the engine 100 is provided with fuel from the fuel system 220 principally via the primary fuel supply 224, with the backup boost pump 226 being used in the event of failure of the primary fuel supply 224.

The engine controller 210 can monitor the fuel pressure to determine whether the fuel system 200 is providing the engine 100 with sufficient fuel pressure. In some embodiments, the engine controller 210 monitors the fuel pressure by receiving fuel pressure readings, for instance from the pressure sensor 230. The fuel pressure readings can be received substantially in real-time, can be encoded or represented in any suitable fashion, and can be obtained by the engine controller 210 via any suitable wired and/or wireless communication channels. In some embodiments, the engine controller 210 monitors the fuel pressure for the engine 100 during startup of the engine 100. This can include monitoring the fuel pressure for the engine 100 during any phase of an ignition sequence of the engine 100, and/or during any phase of a reignition sequence of the engine 100. In other embodiments, the engine controller 210 monitors the fuel pressure for the engine 100 during certain phases of flight of an aircraft of which the engine 100 is a component, for instance during takeoff, landing, and/or other relay phases. In some further embodiments, the engine controller 210 monitors the fuel pressure for the engine 100 in response to the occurrence of particular event, for instance following a flameout event or the like.

By monitoring the fuel pressure associated with the engine 100, the engine controller 210 can detect the occurrence of low-pressure events for the fuel system 200. A low-pressure event occurs when the fuel pressure associated with the engine 100 falls below a predetermined threshold. In the case of the primary fuel supply 224, it can be said that the primary fuel supply 224 experiences a low-pressure event when the fuel pressure associated with the engine 100 falls below the predetermined threshold while the primary fuel supply 224 is responsible for providing the engine 100 with fuel from the reservoir 222.

In some embodiments, a low-pressure event is detected when one or more fuel pressure readings fall below the predetermined threshold. In some other embodiments, a low-pressure event is detected when multiple consecutive fuel pressure readings fall below the predetermined threshold, or when a predetermined number of fuel pressure readings fall below the predetermined threshold within a predetermined time period. In some further embodiments, a low-pressure event is detected when a rolling average of the fuel pressure readings, for instance as assessed over a predetermined interval of time, falls below the predetermined threshold. In some still further embodiments, a low-pressure event is detected based on a trend (i.e. first derivative) of the fuel pressure readings, for instance before any individual one of the pressure readings falls below the predetermined threshold.

Other approaches are also considered. For example, the system 200 can include a plurality of pressure sensors 230, and the engine controller 210 can evaluate fuel pressure readings from the plurality of pressure sensors 230 to confirm whether a low-pressure event has occurred. The predetermined threshold against which the fuel pressure is compared can be any suitable value. In some embodiments, the predetermined threshold and/or the criteria for detecting a low-pressure event is established by a standards agency or regulatory authority.

In response to detecting a low-pressure event for the primary fuel supply 224, the engine controller 210 can activate the backup boost pump 226 in order to provide fuel to the engine 100. In some embodiments, the engine controller 210 is substantially directly connected to the backup boost pump 226, and issues a command to the backup boost pump 226 to cause activation thereof. In other embodiments, the engine controller 210 is connected to the backup boost pump 226 via the electrical relay 240, and commands activation of the backup boost pump 226 via the electrical relay 240.

The electrical relay 240 can be any suitable type of relay device for causing activation of the backup boost pump 226. In some embodiments, the electrical relay 240 is mounted to a vehicle of which the engine 100 is a component. For instance, if the engine 100 is part of an aircraft, the electrical relay 240 can be mounted to an airframe of the aircraft. In other cases, the electrical relay 240 can be mounted to another component of the vehicle. The engine controller 210 can be connected to the electrical relay 240 in any suitable fashion, and the backup boost pump 226 can be coupled to the electrical relay in any suitable fashion.

In operation, the engine controller 210 can monitor the fuel pressure associated with the engine 100 and, responsive to detecting a low pressure event while the primary fuel supply 224 is supplying fuel to the engine 100, activate the backup boost pump 226. In this fashion, the engine controller 210 can attempt to rectify fuel-flow related issues independently from any avionics systems or other control systems, for instance to ensure continued operation of the engine 100.

In some embodiments, the engine controller 210 begins to monitor the fuel pressure, for instance via the pressure sensor 230, in response to detecting an engine flameout event for the engine 100. An engine flameout refers to unintended shutdown of an engine due to the extinction of flames in the combustion chamber, which in some cases is caused by low fuel pressure to the engine 100. For example, the engine controller 210 can detect a flameout event for the engine 100, and can then arm the backup boost pump 226 in response to detecting the flameout event. For instance, the backup boost pump 226 can be armed prior to detecting the low pressure event, which can ensure that the backup boost pump 226 is capable of providing fuel to the engine 100 within a short time period once the low pressure event is detected.

In some embodiments, the engine controller 210 activates the backup boost pump 226, in response to the low pressure event, for a predetermined time delay. Following the time delay, the engine controller 210 can deactivate the backup boost pump 226, for instance to assess whether the primary fuel supply 224 is functional and can supply sufficient fuel pressure to the engine 100. If a subsequent low pressure event is detected, the engine controller 210 can reactivate the backup boost pump 226.

The engine controller 210 can be configured for periodically cycling the backup boost pump 226 off and on to assess whether the primary fuel supply 224 is functional. For example, the engine controller 210 can keep the backup boost pump 226 active for a few seconds or a few minutes, then deactivate the backup boost pump 226 to assess whether the primary fuel supply 224 is functional, then reactivate the backup boost pump 226 if the primary fuel supply is non-functional. In some embodiments, this cycle can continue indefinitely, or until an operator of the engine 100, or of an aircraft or other vehicle of which the engine 100 is a component, instructs the engine controller 210 to halt the cycling of the backup boost pump 226. For instance, the engine controller 210 can receive, via an operator input, a command to halt the cycling of the backup boost pump.

In some embodiments, the fuel system 220 additionally includes one or more fuel filters, which can be located within the fuel conduit 228, at fuel outlets for the primary fuel supply 224 and/or the backup boost pump 226, between the reservoir 222 and the primary fuel supply 224 and/or the backup boost pump 226, or at any other suitable location. Alternatively, or in addition, the engine 100 can include a fuel filter, for instance at a fuel inlet thereof. It can occur that fuel filters become congested; that is say, that the ability of the fuel filter to properly convey fuel becomes diminished. Fuel filters become congested over time, due to accumulation of particulate matter in the fuel which passes through the fuel filters.

In certain embodiments, the system 200 can additionally be used to determine whether fuel filters of the fuel system 220 and/or of the engine 100 have become congested. The fuel pressure readings obtained by the engine controller 210, for instance from the pressure sensor 230, can be acquired and stored, for instance within the engine controller 210 or within a separate data repository. Based on multiple acquired fuel pressure readings, the engine controller 210 can assess whether fuel filters have become congested. In response to detecting that a fuel filter is congested, the engine controller 210 can produce an alert associated with the fuel filter, for instance to inform an operator of the engine 100 that a maintenance action should be performed on the fuel filter. This can include cleaning the filter and/or replacing the filter, as appropriate.

For example, a gradual decline in fuel pressure from the primary fuel supply, for instance over a predetermined period of time, can be indicative of a fuel filter in the fuel conduit 228 having become congested. In another example, a number of consecutive fuel pressure readings which are below the predetermined threshold for a low-pressure event can be indicative of a fuel filter in the fuel conduit 228 having become congested.

In some cases, different pressure sensors 230 can be positioned on opposing sides of a fuel filter. For instance, for a fuel filter located within the fuel conduit 228, a first pressure sensor 230 can be located between the primary fuel supply 224 and the fuel filter, and a second pressure sensor 230 can be located between the fuel filter and the engine 100. If a decrease or drop in fuel pressure, for instance above a predetermined threshold, is detected across the fuel filter, this can indicate that the fuel filter has become congested.

In cases where the backup boost pump 226 and the primary fuel supply 224 use different fuel conduits 228 to provide fuel to the engine 100, the engine controller 210 can command activation of the backup boost pump 226 in response to detecting that a fuel filter in the fuel conduit 228 for the primary fuel supply 224 has become clogged. This may assist in reducing the risk of lack of fuel to the engine 100, and/or the risk of fuel pump cavitation for the primary fuel supply 224.

Figure 3:
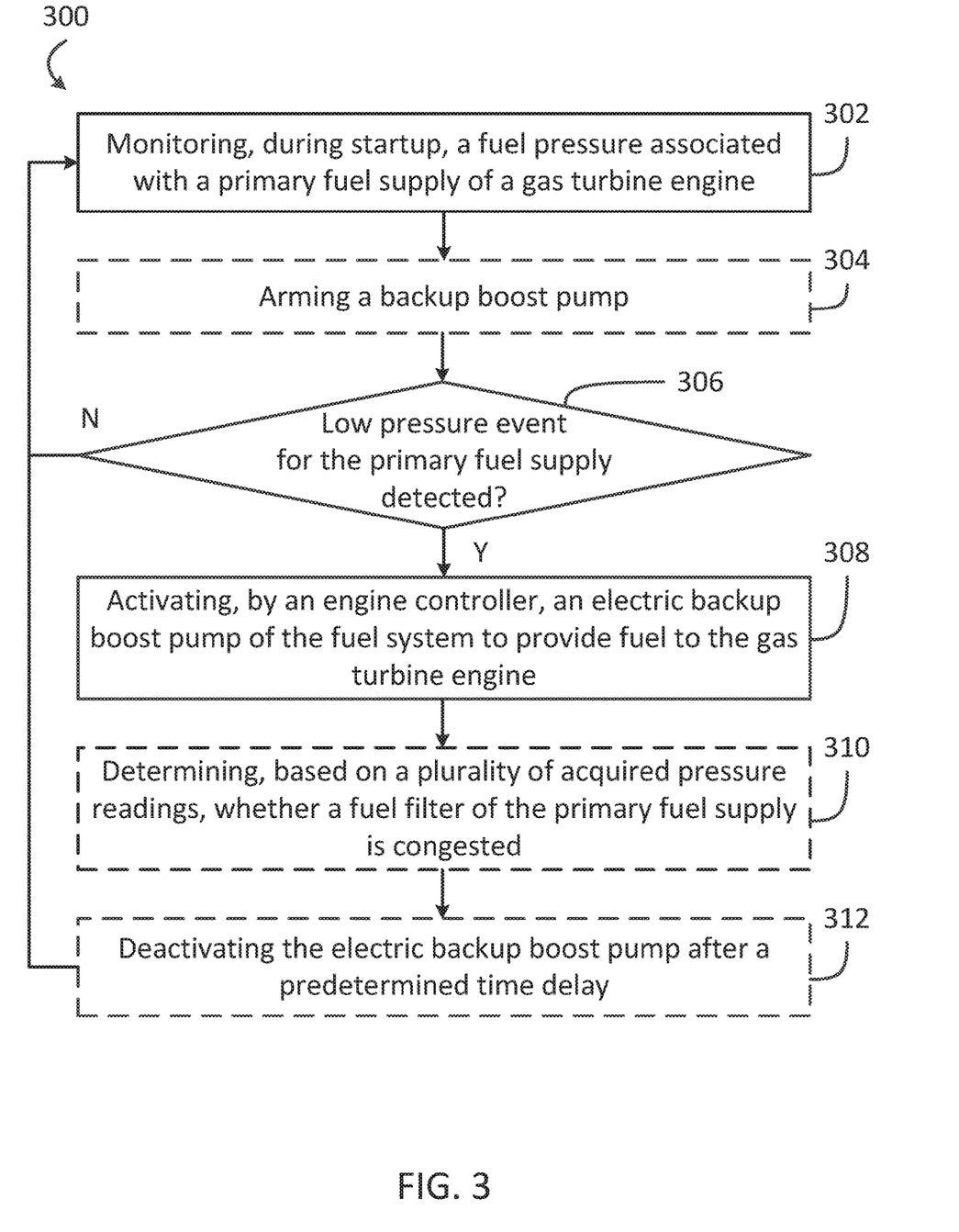
FIG. 3 is a flowchart of an example method for starting a gas turbine engine.

With reference to FIG. 3, there is illustrated a method 300 for starting a gas turbine engine, for instance the engine 100. At step 302, a fuel pressure associated with a primary fuel supply of the engine 100, for instance the primary fuel supply 224, is monitored during startup. In some embodiments, the fuel pressure is monitored by way of a pressure sensor, for instance the pressure sensor 230. In some embodiments, the fuel pressure is monitored responsive to detecting a flameout event for the engine 100.

Optionally, at step 304, a backup boost pump associated with the engine 100 is armed, for instance the backup boost pump 226 of the fuel system 220. The backup boost pump 226 can be armed in response to detecting the flameout event for the engine 100, or concurrently with beginning to monitor the fuel pressure at step 302.

At decision step 306, a determination is made regarding whether a low pressure event for the primary fuel supply 224 has been detected. A low pressure event can be detected when the fuel pressure associated with the primary fuel supply 224 falls below a predetermined threshold. When a low pressure event has been detected, the method 300 moves to step 308. When no low pressure event has been detected, the method 300 moves to some previous step, for instance step 302.

At step 308, when a low pressure event has been detected, the backup boost pump 226 of the fuel system 220 is activated by an engine controller, for instance the engine controller 210, to provide fuel to the engine 100. In some embodiments, the backup boost pump 226 is activated via an electrical relay, for instance the electrical relay 240, which provides electrical power to the backup boost pump 226 and which is activated by the engine controller 210.

Optionally, at step 310, it can be determined whether a fuel filter of the primary fuel supply 224 is congested based on a plurality of acquired pressure readings, for instance from the pressure sensor 230. For example, the engine controller 210 can detect a gradual decrease in fuel pressure across the fuel filter, which can indicate that the fuel filter is congested. In some embodiments, the engine controller 210 can produce an alert associated with the fuel filter, for instance to inform an operator of the engine 100 that a maintenance action should be performed on the fuel filter.

Optionally, at step 312, the backup boost pump 226 can be deactivated, for instance after a predetermined time delay. After the backup boost pump 226 has been deactivated, the method 300 can return to some previous step, for instance the step 302, and resume monitoring the fuel pressure associated with the primary fuel supply 224. In this fashion, an assessment can be made regarding whether the primary fuel supply 224 is functional. If the primary fuel supply 224 is non-functional, a subsequent low pressure event will be detected at step 306, and the backup boost pump 226 can be reactivated at step 308. The method 300 can continue looping indefinitely, as appropriate, or can be halted, for instance in response to receipt of an operator input.

Figure 4:
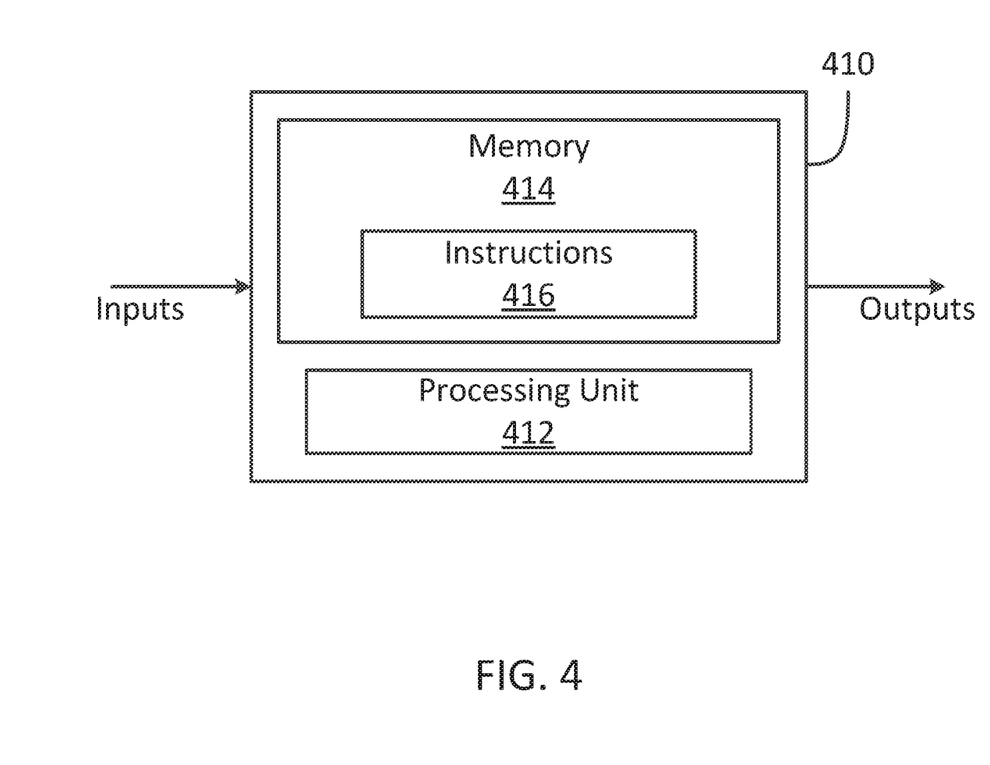
FIG. 4 is a block diagram of an example computing device for implementing the method of FIG. 3.

With reference to FIG. 4, the method 300 may be implemented by a computing device 410, which can embody part or all of the engine controller 210. The computing device 410 comprises a processing unit 412 and a memory 414 which has stored therein computer-executable instructions 416. The processing unit 412 may comprise any suitable devices configured to implement the functionality of the processing unit 230 and/or the functionality described in the method 300, such that instructions 416, when executed by the computing device 410 or other programmable apparatus, may cause the functions/acts/steps performed by the processing unit 230 and/or described in the method 300 as provided herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

It should be noted that the computing device 410 may be implemented as part of a FADEC or other similar device, including electronic engine control (EEC), engine control unit (EUC), engine electronic control system (EECS), and the like. In addition, it should be noted that the techniques described herein can be performed by the engine controller 210 substantially in real-time, during operation of the engine 100, for example during a flight mission.

The methods and systems for starting a gas turbine engine as described herein may be implemented in a high level procedural or object oriented programming or scripting language, or a combination thereof, to communicate with or assist in the operation of a computer system, for example the computing device 410. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method of starting a gas turbine engine, comprising:
monitoring, during startup of the gas turbine engine, a fuel pressure associated with a primary fuel supply of the gas turbine engine, the primary fuel supply being configured to provide fuel from a reservoir to the gas turbine engine;
detecting a low pressure event for the primary fuel supply when the fuel pressure falls below a predetermined threshold; and
responsive to detecting the low pressure event, activating, by an engine controller, an electric backup boost pump to provide fuel from the reservoir to the gas turbine engine, wherein the electric backup boost pump operates independently of the primary fuel supply and draws fuel from the reservoir separately of the primary fuel supply,
wherein the method also includes:
acquiring a plurality of pressure readings associated with the primary fuel supply over a time interval; and
determining, based on the plurality of pressure readings, whether a fuel filter of the primary fuel supply is congested by detecting a number of consecutive pressure readings below the predetermined threshold within the time interval.

2. The method of claim 1, wherein monitoring the fuel pressure is performed responsive to detecting a flameout event for the gas turbine engine.

3. The method of claim 2, further comprising arming the electric backup boost pump responsive to detecting the flameout event and prior to detecting the low pressure event.

4. The method of claim 1,
comprising detecting the low pressure event when at least two of the plurality of pressure readings are below the predetermined threshold.

5. The method of claim 1, further comprising
deactivating the electric backup boost pump after a predetermined time delay;
detecting one or more subsequent low pressure events for the primary fuel supply; and
responsive to detecting the one or more subsequent low pressure events, reactivating, by the engine controller, the electric backup boost pump to provide fuel to the gas turbine engine.

6. The method of claim 1, further comprising:
obtaining a request to halt the electric backup boost pump via an operator input; and
halting, by the engine controller, the electric backup boost pump.

7. The method of claim 1, wherein determining whether the fuel filter is congested comprises detecting, within the plurality of pressure readings, a gradual decline in the fuel pressure.

8. The method of claim 1, wherein activating the electric backup boost pump comprises activating, by the engine controller, an airframe-mounted relay to provide electrical power to the electric backup boost pump.

9. A system for starting a gas turbine engine, comprising:
a processing unit; and
a non-transitory computer-readable memory communicatively coupled to the processing unit and comprising computer-readable program instructions executable by the processing unit for:
monitoring, during startup of the gas turbine engine, a fuel pressure associated with a primary fuel supply of the gas turbine engine, the primary fuel supply being configured to provide fuel from a reservoir to the gas turbine engine;
detecting a low pressure event for the primary fuel supply when the fuel pressure falls below a predetermined threshold; and
responsive to detecting the low pressure event, activating, by an engine controller, an electric backup boost pump to provide fuel from the reservoir to the gas turbine engine, wherein the electric backup boost pump operates independently of the primary fuel supply and draws fuel from the reservoir separately of the primary fuel supply,
wherein:
monitoring the fuel pressure is performed responsive to detecting a flameout event for the gas turbine engine; and
the computer-readable program instructions are also executable by the processing unit for arming the electric backup boost pump responsive to detecting the flameout event and prior to detecting the low pressure event.

10. The system of claim 9, wherein detecting the low pressure event comprises:
comparing a plurality of pressure readings to the predetermined threshold; and
detecting the low pressure event when at least two of the plurality of pressure readings are below the predetermined threshold.

11. The system of claim 9, wherein the computer-readable program instructions are executable by the processing unit for:
deactivating the electric backup boost pump after a predetermined time delay;
detecting one or more subsequent low pressure events for the primary fuel supply; and responsive to detecting the one or more subsequent low pressure events, reactivating, by the engine controller, the electric backup boost pump to provide fuel to the gas turbine engine.

12. The system of claim 9, wherein the computer-readable program instructions are executable by the processing unit for:
   obtaining a request to halt the electric backup boost pump via an operator input; and
   halting, by the engine controller the electric backup boost pump.

13. The system of claim 9, wherein the computer-readable program instructions are executable by the processing unit for:
   acquiring a plurality of pressure readings associated with the primary fuel supply over a time interval; and
   determining, based on the plurality of pressure readings, whether a fuel filter of the primary fuel supply is congested.

14. The system of claim 9, wherein activating the electric backup boost pump comprises activating, by the engine controller, an airframe-mounted relay to provide electrical power to the electric backup boost pump.

15. A method of starting a gas turbine engine, comprising:
   monitoring, during startup of the gas turbine engine, a fuel pressure associated with a primary fuel supply of the gas turbine engine, the primary fuel supply being configured to provide fuel from a reservoir to the gas turbine engine;
   detecting a low pressure event for the primary fuel supply when the fuel pressure falls below a predetermined threshold; and
   responsive to detecting the low pressure event, activating, by an engine controller, an electric backup boost pump to provide fuel from the reservoir to the gas turbine engine, wherein the electric backup boost pump operates independently of the primary fuel supply and draws fuel from the reservoir separately of the primary fuel supply,
   wherein:
      monitoring the fuel pressure is performed responsive to detecting a flameout event for the gas turbine engine; and
      the method also includes arming the electric backup boost pump responsive to detecting the flameout event and prior to detecting the low pressure event.

\* \* \* \* \*